(12) United States Patent
Mandai

(10) Patent No.: US 11,278,966 B2
(45) Date of Patent: Mar. 22, 2022

(54) CUTTING TOOL FOR MACHINING DIFFERENTIAL CASE, MACHINING APPARATUS FOR DIFFERENTIAL CASE AND MACHINING METHOD FOR DIFFERENTIAL CASE

(71) Applicant: HARU Technique Laboratory Inc., Okayama (JP)

(72) Inventor: Haruo Mandai, Okayama (JP)

(73) Assignee: HARU TECHNIQUE LABORATORY INC., Okayama (JP)

(*) Notice: Subject to any disclaimer, the term of this patent is extended or adjusted under 35 U.S.C. 154(b) by 0 days.

(21) Appl. No.: 16/608,315

(22) PCT Filed: Dec. 1, 2017

(86) PCT No.: PCT/JP2017/043349
§ 371 (c)(1),
(2) Date: Oct. 25, 2019

(87) PCT Pub. No.: WO2019/106844
PCT Pub. Date: Jun. 6, 2019

(65) Prior Publication Data
US 2021/0101212 A1 Apr. 8, 2021

(51) Int. Cl.
*B23B 5/40* (2006.01)
*B23B 27/00* (2006.01)

(52) U.S. Cl.
CPC .............. *B23B 5/40* (2013.01); *B23B 27/007* (2013.01); *B23B 2265/36* (2013.01)

(58) Field of Classification Search
CPC ........ B23C 5/40; B23C 29/034; B23C 41/12; B23C 41/00; B23C 2265/36; B23C 27/00; B23B 3/00; B23B 25/00
See application file for complete search history.

(56) References Cited

U.S. PATENT DOCUMENTS 3,389,454 A * 6/1968 Sattler .................... B23B 35/00
29/406
4,176,565 A 12/1979 Schulz
(Continued)

FOREIGN PATENT DOCUMENTS

CN 202701510 U 1/2013
EP 1 852 214 A1 11/2007
(Continued)

OTHER PUBLICATIONS

International Search Report issued in Application No. PCT/JP2017/043349 dated Feb. 20, 2018.
(Continued)

*Primary Examiner* — Nicole N Ramos
(74) *Attorney, Agent, or Firm* — Pearne & Gordon LLP

(57) ABSTRACT

A cutting tool (35) for machining a differential case, the cutting tool (35) being attached to a machining apparatus and used to perform cutting on a spherical inner surface of a differential case (10), the cutting tool (35) including: a shaft part (50); a cutting edge (51) laterally protruding from the shaft part (50); a fixing part (53) formed at one end side of the shaft part (50) and that is for fixing the shaft part (50) to the machining apparatus; and a retaining part (54) formed at the other end side of the shaft part (50) and that is for retaining the shaft part (50) by the machining apparatus, wherein the cutting tool (35) is able to perform cutting on the spherical inner surface of the rotating differential case (10) in a both-ends-held state in which both the fixing part (53) and the retaining part (54) are supported by the machining apparatus.

7 Claims, 13 Drawing Sheets

(56) References Cited

U.S. PATENT DOCUMENTS

| | | | |
|---|---|---|---|
| 4,309,925 A | | 1/1982 | Mottershead et al. |
| 5,207,749 A | * | 5/1993 | Ariyoshi ................ B23B 29/02 |
| | | | 409/143 |
| 5,232,317 A | * | 8/1993 | Peuterbaugh ............ B23C 3/00 |
| | | | 407/107 |
| 6,220,794 B1 | * | 4/2001 | Calamia ................ B23C 3/023 |
| | | | 407/40 |
| 6,578,453 B1 | | 6/2003 | Hatano et al. |
| 6,722,826 B2 | * | 4/2004 | Cavanaugh ............. B23C 5/14 |
| | | | 408/708 |
| 7,096,563 B2 | * | 8/2006 | Walz .................... B23B 29/025 |
| | | | 29/558 |
| 7,909,548 B2 | * | 3/2011 | Wirtanen ............... B23C 3/023 |
| | | | 409/132 |
| 2007/0116533 A1 | * | 5/2007 | Wirtanen ............... B23C 3/00 |
| | | | 409/132 |
| 2008/0267727 A1 | | 10/2008 | Wirtanen et al. |
| 2010/0257980 A1 | | 10/2010 | Hyatt et al. |

FOREIGN PATENT DOCUMENTS

| | | |
|---|---|---|
| EP | 2 095 896 A1 | 9/2009 |
| JP | 1988-120701 U | 8/1988 |
| JP | 2001-341013 A | 12/2001 |
| JP | 2002-263908 A | 9/2002 |
| JP | 2005-7534 A | 1/2005 |
| JP | 2007-030101 A | 2/2007 |
| JP | 2010-052069 A | 3/2010 |
| JP | 2013-226631 A | 11/2013 |
| JP | 2014-195851 A | 10/2014 |

OTHER PUBLICATIONS

Written Opinion issued in Application No. PCT/JP2017/043349 dated Feb. 20, 2018.

* cited by examiner

CUTTING TOOL FOR MACHINING DIFFERENTIAL CASE, MACHINING APPARATUS FOR DIFFERENTIAL CASE AND MACHINING METHOD FOR DIFFERENTIAL CASE

TECHNICAL FIELD

The present disclosure relates to a cutting tool for performing cutting on the spherical inner surface of a differential case (differential gear case), a machining apparatus for a differential case using the cutting tool, and a machining method for a differential case.

BACKGROUND

Conventionally, there have been known various machining apparatuses for performing cutting operation on the spherical inner surface of a differential case. For example, in the workpiece machining jig apparatus disclosed in Patent Literature 1, a differential case is supported by a foundation rotated by a motor, and it is possible to perform cutting on the inner surface of the differential case by a cutting tool (machining tool). More specifically, while rotating the foundation on which the differential case is set, the NC-controlled cutting tool is brought into contact with the lower end of the machined surface of the differential case inner surface. The cutting tool is moved in an arcuate manner from the lower end part to the upper end part of the machined surface to perform cutting operation.

In the following, the conventional cutting operation on the spherical inner surface of a differential case will be described more specifically with reference to FIG. 15. FIG. 15 is a schematic diagram illustrating the main part of the conventional example of a workpiece 100 (differential case) machining state. The workpiece 100 is illustrated in section. Shaft holes 102 are formed in the side surface of a cylindrical part 101, and a pair of window-like openings 103 are formed in the upper and lower portions of the cylindrical part 101. An inner surface 104 of the workpiece 100 is formed as a spherical surface. A cutting tool 200 having a cutting edge 201 at its distal end enters the cylindrical part 101.

During the cutting of the workpiece 100, the cutting edge 201 of the cutting tool 200 abuts the inner surface 104 of the workpiece 100, the inner surface 104 is cut into a spherical configuration, with the workpiece 100 rotating in the direction of the arrow B around the center axis 105 thereof. After this, the cutting edge 201 moves along the inner surface 104 of the workpiece 100, and the entire inner surface 104 is cut into a spherical configuration.

CITATION LIST

Patent Literature

Patent Literature 1: Japanese Utility Model Application Laid-open No. 63-120701

SUMMARY

In the above-described cutting of a differential case, however, the cutting tool is in the cantilever-like state, so that it is not suitable for heavy cutting. It is necessary to reduce the infeed and to increase the number of times that cutting is performed. Further, it is necessary to delay the cutting feed. Thus, the requisite cutting time per workpiece 100 is rather long. Further, long cutting time leads to long cutting distance (the path of the cutting edge 201 on the inner surface 104 along the rotational direction), resulting in short service life of the cutting tool.

The present disclosure has been made with view toward solving the above problems in the prior art. It is an object of the present disclosure to provide a cutting tool for a differential case, a machining apparatus for a differential case, and a machining method for a differential case making it possible to perform heavy cutting, allowing a reduction in workpiece cutting time, and helping to elongate the service life of the cutting tool.

To achieve the above object, there is provided, in accordance with the present disclosure, a cutting tool for machining a differential case, the cutting tool being attached to a machining apparatus and used to perform cutting on a spherical inner surface of a differential case, the cutting tool including: a shaft part; a cutting edge laterally protruding from the shaft part; a fixing part formed at one end side of the shaft part and that is for fixing the shaft part to the machining apparatus; and a retaining part formed at the other end side of the shaft part and that is for retaining the shaft part by the machining apparatus, wherein the cutting tool is able to perform cutting on the spherical inner surface of the rotating differential case in a both-ends-held state in which both the fixing part and the retaining part are supported by the machining apparatus.

In this structure, cutting is performed in a both-ends-held state, whereby it is possible to prevent resonance of the cutting tool during machining, so that it is possible to increase the infeed by the cutting edge and to increase the cutting feed speed. That is, in accordance with the present disclosure, it is possible to perform heavy cutting, and, further, to reduce the cutting time per workpiece. Further, since it is possible to prevent resonance, the cutting edge is less subject to damage, resulting in a longer service life of the cutting tool. Further, since it is possible to expedite the cutting feed, the cutting time can be shortened, so that the cutting distance (the path of the cutting edge on the inner surface along the rotational direction of the workpiece) is shortened, which also helps to elongate the service life of the cutting tool.

In the cutting tool for machining a differential case according to the present disclosure, it is desirable for the cutting edge to have an arcuate shape. In this structure, the cutting edge bears the cutting with respect to the workpiece over a wide range, so that the burden on the cutting edge is reduced, the wear of the cutting edge is reduced, and the service life of the cutting tool is elongated. Further, since the cutting edge takes on the cutting over a wide range with respect to the workpiece, the moving distance in the horizontal direction of the cutting tool is shorted, which is advantageous in preventing interference between the shaft part and the workpiece opening, leaving room for an increase in the diameter of the shaft part of the cutting tool. When the diameter of the shaft part of the cutting tool is enlarged to achieve an enhancement in rigidity, it is possible to increase the infeed by the cutting edge, and the cutting feed is expedited, which is advantageous from the viewpoint of heavy cutting.

A machining apparatus for a differential case according to the present disclosure is an apparatus using a cutting tool for machining each differential case, wherein the machining apparatus for a differential case is equipped with an engagement part engaged with the retaining part. A machining method for a differential case according to the present disclosure is a machining method using a cutting tool for machining each differential case, wherein in a both-ends-held state in which both the fixing part and the retaining part are supported by the machining apparatus, the cutting edge is brought into contact with the inner surface of the rotating differential case; and the differential case or the cutting tool is moved to perform cutting on the spherical inner surface of the differential case while varying a contact position where the cutting edge and the inner surface of the differential case are held in contact with each other.

In the machining apparatus for a differential case and in the machining method for a differential case according to the present disclosure, there is used a cutting tool for machining a differential case according to the present disclosure, so that heavy cutting is possible, the work cutting time can be shortened, and the service life of the cutting tool is elongated.

The present disclosure provides the effects as described above. Through the machining in a both-ends-held state, it is possible to prevent resonance of the cutting tool during machining, so that the infeed by the cutting edge can be increased, and the cutting feed can be expedited. That is, the cutting according to the present disclosure enables heavy cutting, and the cutting time per workpiece can be shortened. Further, since resonance can be prevented, the cutting edge is less subject to damage, and the service life of the cutting tool is elongated. Further, since the cutting feed can be expedited, the cutting time is shortened, so that the cutting distance (the path of the cutting edge on the inner surface along the rotational direction of the workpiece) is shortened, which also helps to elongate the service life of the cutting tool.

DETAILED DESCRIPTION OF THE EMBODIMENTS

Figure 1:
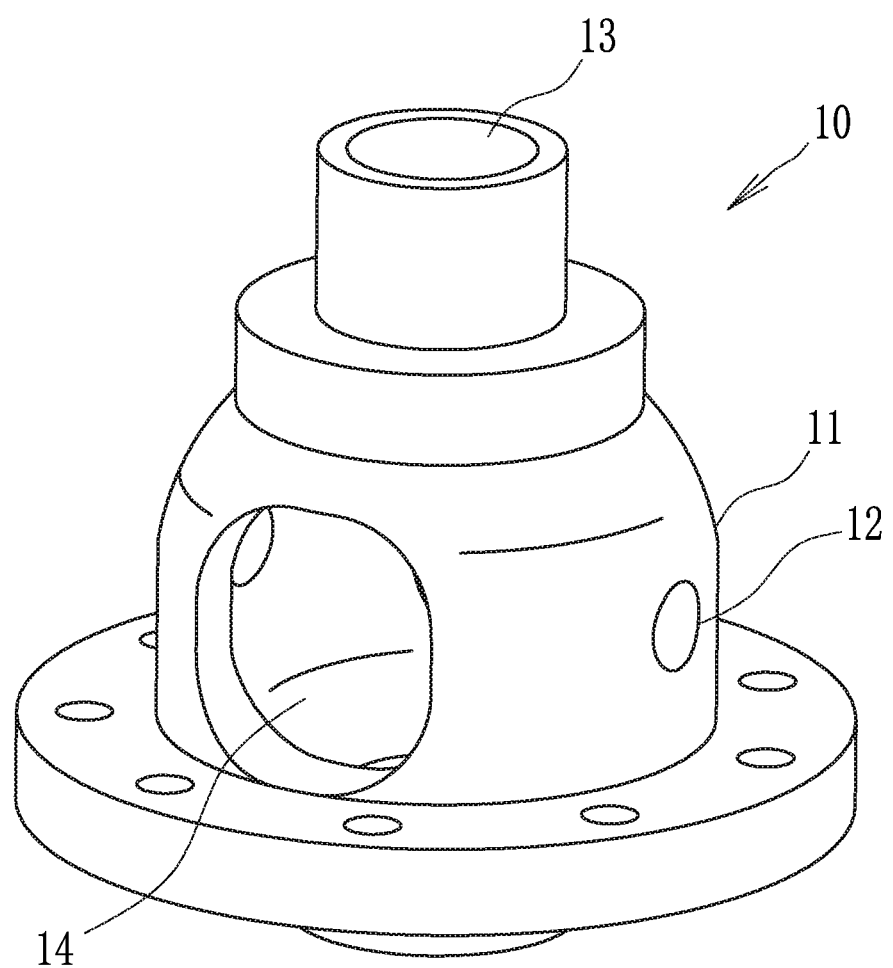
FIG. 1 is a perspective view of a workpiece constituting the object of machining of a differential case machining apparatus according to an embodiment of the present disclosure.

In the following, an embodiment of the present disclosure will be described with reference to the drawings. First, a workpiece 10 constituting the object of machining will be described with reference to FIGS. 1 through 3. The workpiece 10 is a differential case which is a building-in case for a differential transmission. FIG. 1 is a perspective view of the workpiece 10, FIG. 2 is a longitudinal sectional view of the workpiece 10 illustrated in FIG. 1, and FIG. 3 is a lateral sectional view of the workpiece 10 illustrated in FIG. 1.

Figure 2:
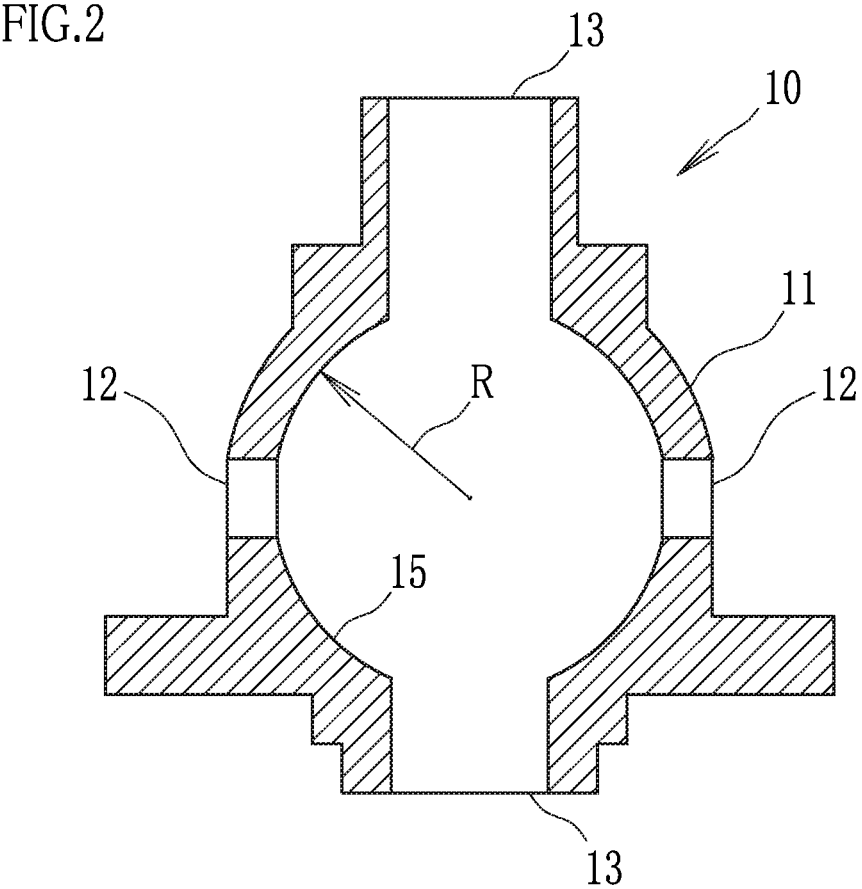
FIG. 2 is a longitudinal sectional view of the workpiece illustrated in FIG. 1.
Figure 3:
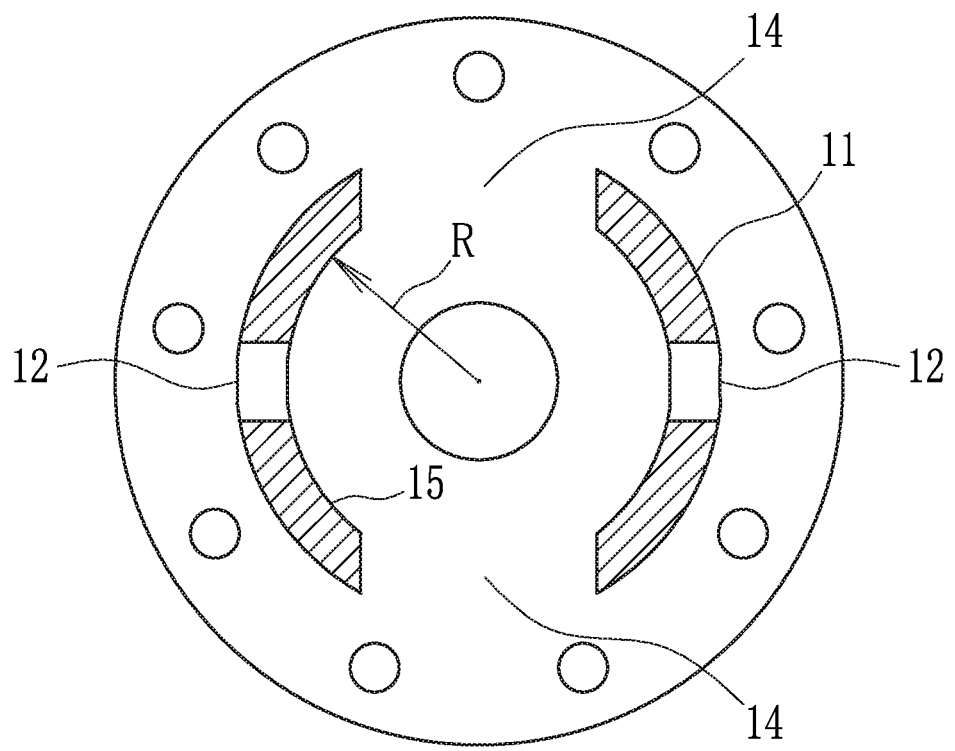
FIG. 3 is a lateral sectional view of the workpiece illustrated in FIG. 1.

In FIG. 2, shaft holes 12 that are a pair of through-holes are formed in side surface of a cylindrical part 11, and at the upper and lower portions of the cylindrical part 11, there are formed axle holes 13 that are a pair of through-holes. Further, in FIG. 3, a pair of window-like openings 14 are formed in the side surface the cylindrical part 11. An inner surface 15 of the workpiece 10 is formed as a spherical surface of a radius R.

Figure 4:
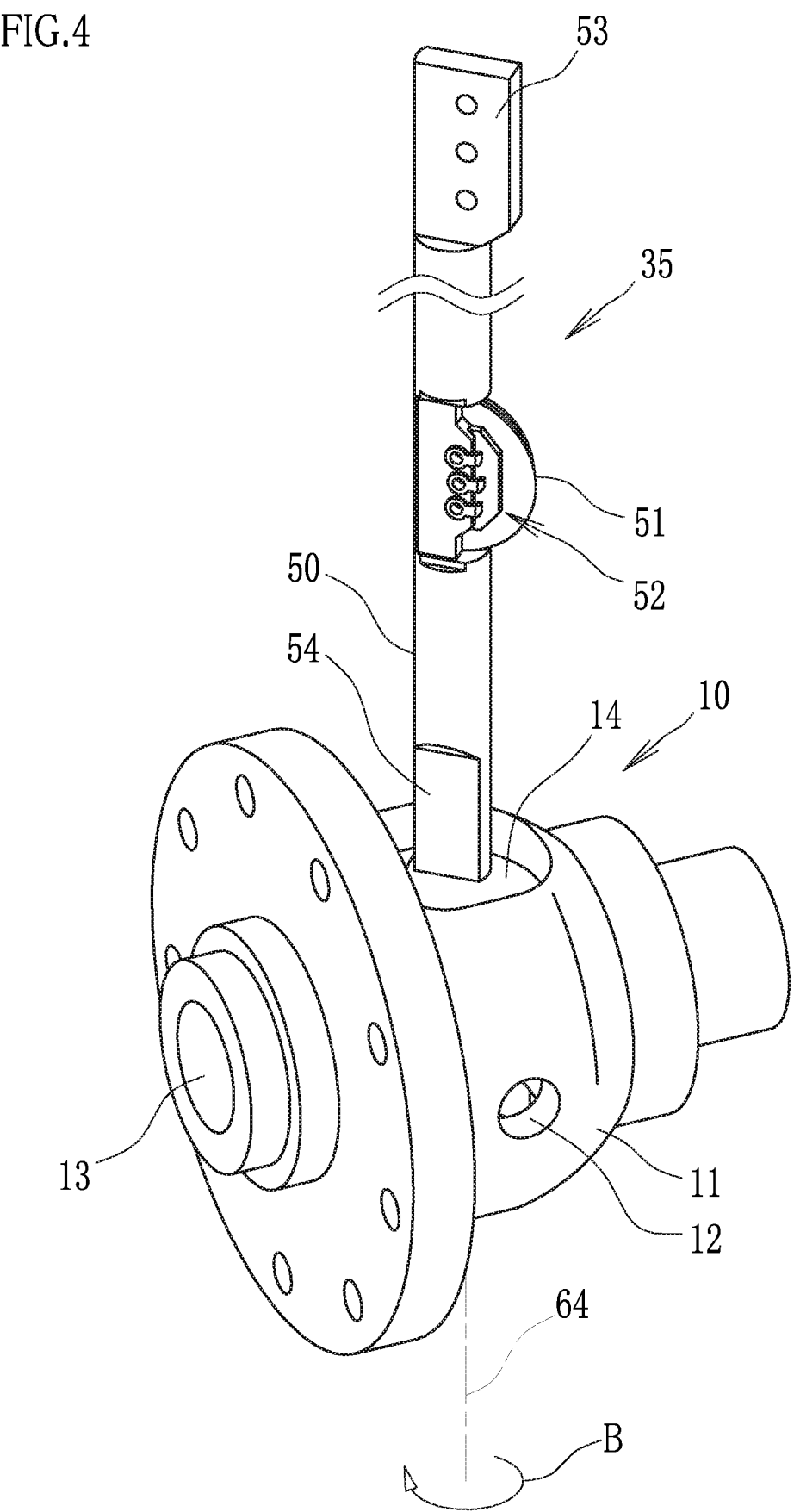
FIG. 4 is a perspective illustrating the state immediately before the entrance of the cutting tool from a workpiece opening in an embodiment of the present disclosure.

FIG. 4 is a perspective view illustrating the state immediately before a cutting tool 35 enters from the opening 14 of the workpiece 10. When machining the workpiece 10 by the cutting tool 35, a machining apparatus is employed. A fixing part 53 of the cutting tool 35 is fixed to the machining apparatus, and the workpiece 10 retained by the machining apparatus is machined by the cutting tool 35. The machining apparatus may be a general-purpose apparatus. For example, it is an apparatus in which a tool base to which the cutting tool 35 is fixed can be moved in the up-down direction, the right-left direction, and the front-rear direction, and which is equipped with a clamper retaining the workpiece 10 and a rotary foundation rotating the workpiece 10.

While in the present embodiment described here the inner surface (spherical surface) the differential case is machined by the cutting tool 35, it is also possible to machine differential case shaft holes, knock holes, side gear holes, axle holes, etc. by using a machining apparatus equipped with a mechanism for moving the cutting tool in the right-left direction.

In FIG. 4, when performing the inner surface machining of the workpiece 10, the tool base to which the cutting tool 35 is fixed is lowered, and the cutting tool 35 is caused to enter the workpiece 10. In FIG. 4, the cutting tool 35 is equipped with a shaft part 50, a tip 52 laterally protruding from the shaft part 50 and having an arcuate cutting edge 51, a fixing part 53 formed at one end side of the shaft part 50 and that is for fixing the shaft part 50 to the machining apparatus, and a retaining part 54 formed at the other end side of the shaft part 50 and that is for retaining the shaft part 50 at the machining apparatus. As described in detail below, in a both-ends-held state in which both the fixing part 53 and the retaining part 54 are supported by the machining apparatus, the inner surface of the rotating differential case 10 is machined by the cutting edge 51.

Taking into account the load on the inner surface 15 of the workpiece 10 during machining, it is desirable for the radius of the arcuate portion of the cutting edge 51 to be smaller than the radius of the spherical surface forming the inner surface 15. For example, when the radius of the spherical surface forming the inner surface 15 is 35 mm, the radius of the arcuate portion of the cutting edge 51 is 30 mm.

Figure 5:
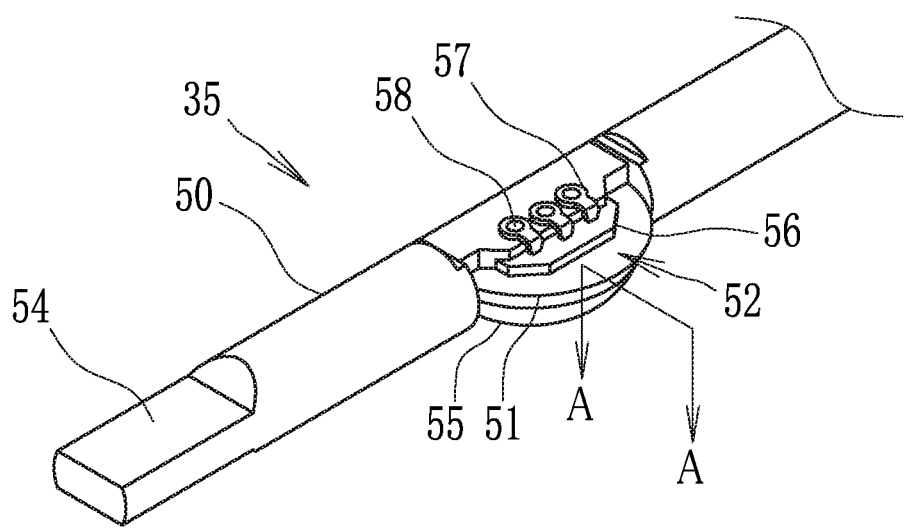
FIG. 5 is a perspective view, as seen from a different angle, of the cutting tool illustrated in FIG. 4.

FIG. 5 is a perspective view, as seen from a different angle, of the cutting tool 35 illustrated in FIG. 4. The retaining part 54 formed at the distal end of the shaft part 50 forms a surface different from the shaft part 50. As described in detail below, for example, in FIG. 8, the retaining part 54 is inserted into an engagement part 63 formed in a cutting tool retaining body 60 provided in a rotary foundation 5 of the machining apparatus, whereby the distal end side of the cutting tool 35 is supported. As illustrated successively in the process diagrams of FIGS. 10 through 13, it is necessary for the retaining part 54 to move in the right-left direction while inserted into the engagement part 63, so that the retaining part 54 has a pair of parallel surfaces as illustrated in FIG. 5.

Figure 6:
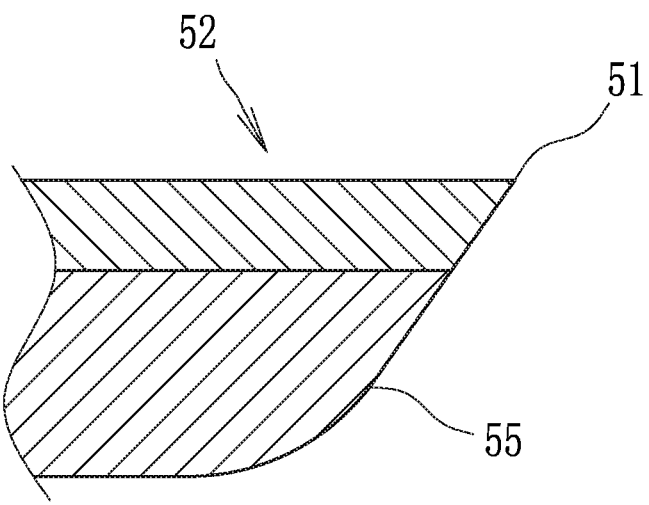
FIG. 6 is a sectional view taken along line AA of FIG. 5.

FIG. 6 is a sectional view taken along line AA of FIG. 5, and is a sectional view of the portion in the vicinity of the tip 52. At the distal end of the tip 52, there is formed the cutting edge 51, and the tip 52 is placed on a receiving part 55 that is integral with the shaft part 50. As illustrated in FIG. 5, the tip 52 is held between the receiving part 55 and a support plate 56, and the distal ends of support claws 57 fixed to the shaft part 50 by screws 58 hold the support plate 56. As a result, the tip 52 is fixed to the shaft part 50.

As illustrated in FIG. 6, the cutting edge 51 is formed to be sharp, so that the cutting tool 35 is suitable for finish machining. For example, of a plurality of cutting tools fixed to the tool post, one is used as the cutting tool for rough cutting. After the rough cutting of the inner surface 15 of the workpiece 10, finish machining is performed by the cutting tool 35.

Figure 7:
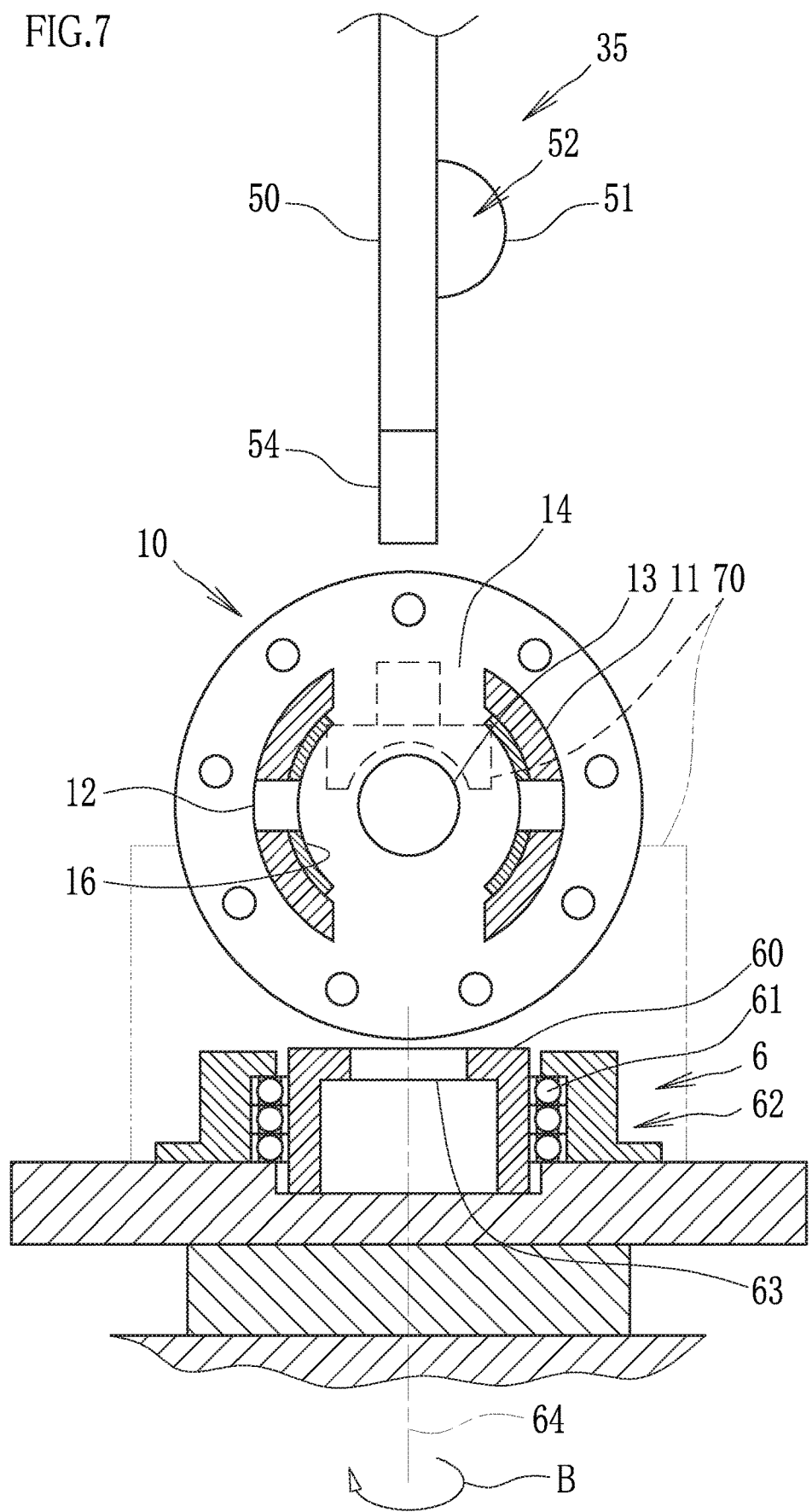
FIG. 7 is a sectional view of an embodiment of the present disclosure, illustrating the main part thereof with the workpiece being set on a rotary foundation for the same.

In the following, the machining of the inner surface of the workpiece 10 using the cutting tool 35 will be described. FIG. 7 is a sectional view of the main part in the state in which the workpiece 10 is set on the rotary foundation 6. The rotary foundation 6 is a component of the machining apparatus, and is a part of the machining apparatus. The workpiece 10 and the rotary foundation 6 are illustrated in section. The workpiece 10 is the same as the workpiece 10 illustrated in FIGS. 1 through 3. For the sake of convenience in the illustration of the cutting operation, a cutting stock 16 on the inner surface of the workpiece 10 is illustrated in an exaggerated state. The portion in the vicinity of the tip 52 of the cutting tool 35 is illustrated in a simplified state. These illustrations are the same from FIG. 9 onward.

The rotary foundation 6 is equipped with a cutting tool retaining body 60 and a rotary body 62, and a bearing 61 is provided between them. The rotary body 62, which is composed of a plurality of components, will be generally referred to as the rotary body 62 for the sake of convenience. The rotary body 62 rotates around a center axis 64 (See arrow B). Even when the rotary body 62 rotates, the cutting tool retaining body 60 arranged on the inner side of the bearing 61 is maintained stationary.

The workpiece 10 is fixed to the rotary body 62 by a clamper 70, and rotates integrally with the rotary body 62 around the center axis 64 (See arrow B). For the sake of convenience, FIG. 4 also illustrates the center axis 64 of the rotary body 62. In FIG. 4, the workpiece 10 rotates in the direction of arrow B around the center axis 64. The RPM ranges, for example, 400 to 600 rpm.

Figure 8:
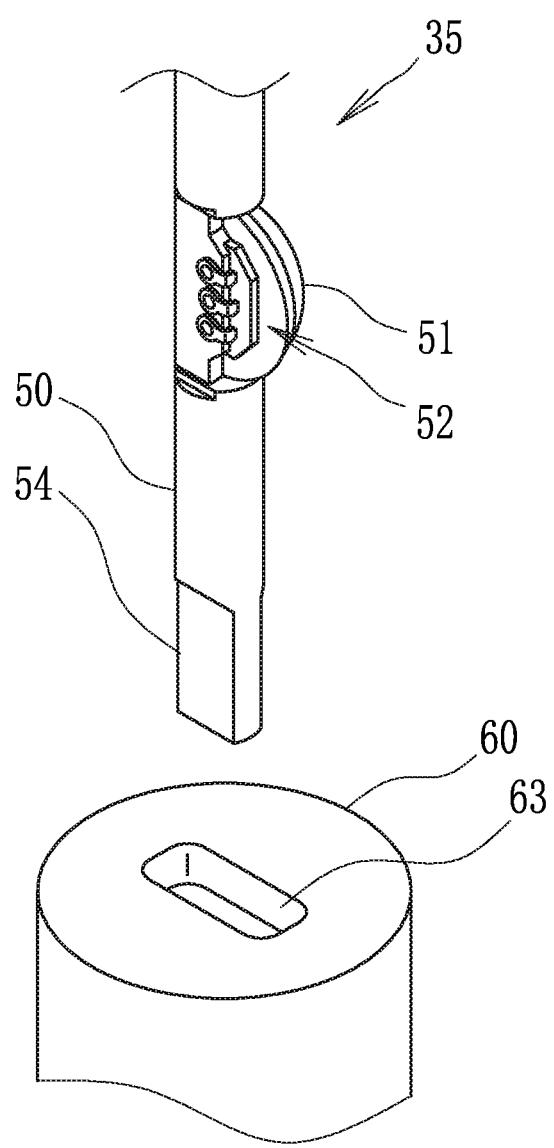
FIG. 8 is a perspective view of an embodiment of the present disclosure, illustrating the main part thereof immediately before the cutting tool is retained by the cutting tool retaining body.

FIG. 8 is a perspective view illustrating the main part in the state immediately before the retention of the cutting tool 35 by the cutting tool retaining body 60. The retaining part 54 at the distal end of the cutting tool 35 is detachable with respect to the engagement part 63 formed in the cutting tool retaining body 60. During the cutting of the workpiece 10 by the cutting tool 35, the retaining part 54 at the distal end of the cutting tool 35 is retaining by the cutting tool retaining body 60. The engagement part 63 is formed in the cutting tool retaining body 60. The retaining part 54 at the distal end of the cutting tool 35 is inserted into the engagement part 63, and the distal end of the cutting tool 35 is retained. In this state, the cutting by the cutting edge 51 is performed.

Figure 9:
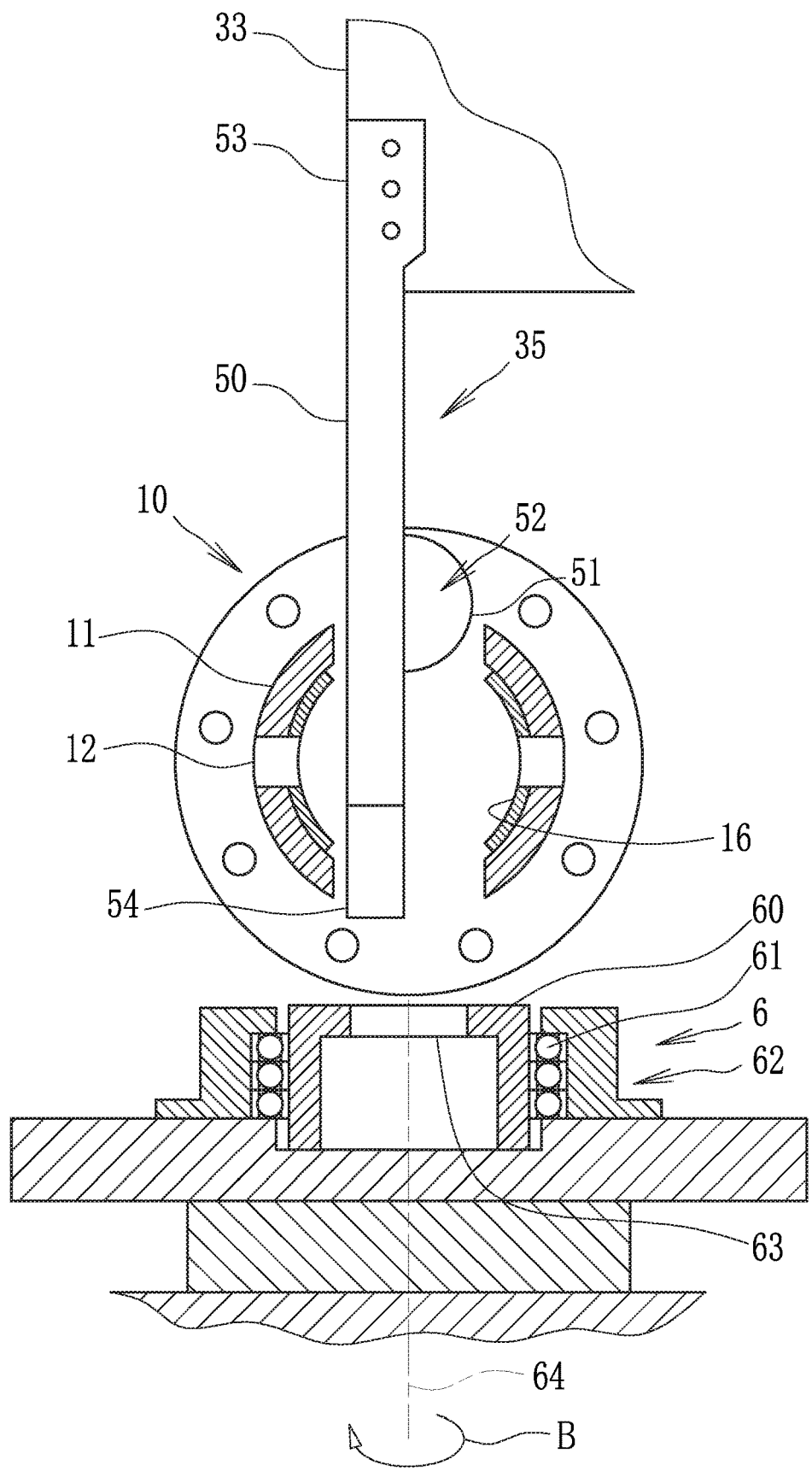
FIG. 9 is a sectional view of an embodiment of the present disclosure, illustrating the main part immediately before the machining of the workpiece.

In the following, the machining of the inner surface of the workpiece 10 will be described sequentially. FIG. 9 is a sectional view illustrating the main part in the state immediately before the machining of the workpiece 10. The drawing illustrates the cutting tool 35 as descended from the position of FIG. 7. To facilitate the understanding of the drawings, from FIG. 9 onward, the clamper 70 illustrated in FIG. 7 and the shaft holes 13 of the workpiece 10 will be omitted. The fixing part 53 of the cutting tool 35 is fixed to a tool stand 33 which is a component of the machining apparatus.

In the state of FIG. 9, the tip 52 of the cutting tool 35 is entering the cylindrical part 11 of the workpiece 10. Although the cutting tool 35 moves integrally with the tool stand 33 in the up-down direction and the right-left direction, it does not rotate around the shaft part 10. On the other hand, the workpiece 10 is rotating in the direction of arrow B around the center axis 64, and the workpiece 10 is in a standby condition for the inner surface machining.

Figure 10:
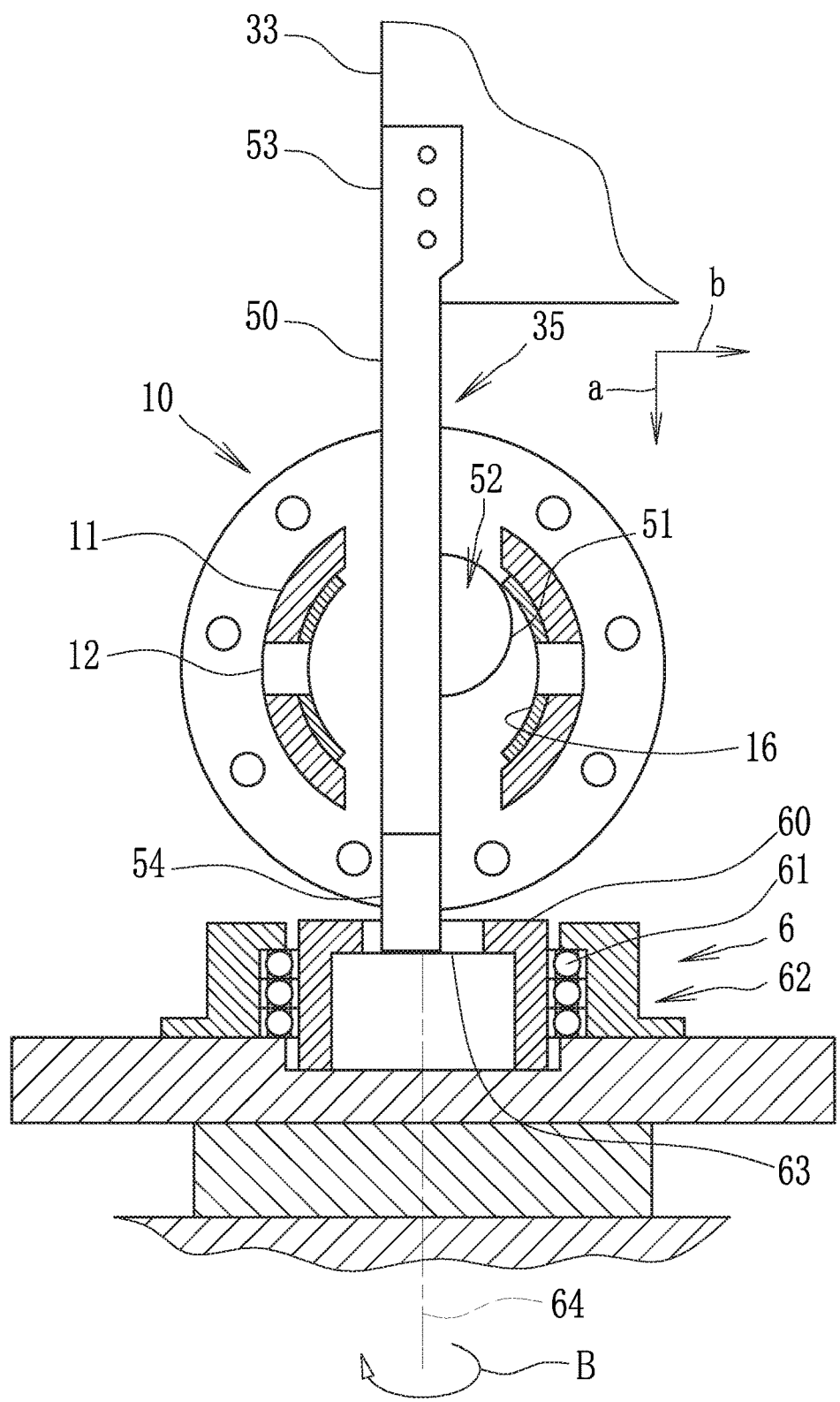
FIG. 10 is a sectional view of an embodiment of the present disclosure, illustrating the main part when the machining of the workpiece is started.

FIG. 10 is a sectional view illustrating the main part in the state in which the machining of the workpiece 10 is started. In the state of the drawing, the cutting tool 35 descends from the position of FIG. 9 (in the direction of arrow a), moves horizontally to the outer side of the workpiece 10 (in the direction of arrow b), and the cutting edge 51 of the cutting tool 35 is in contact with the cutting stock 16 of the workpiece 10. The cutting tool 35 descends further, whereby the retaining part 54 at the distal end of the cutting tool 35 is inserted into the engagement part 63 of the cutting tool retaining body 60. As a result, the cutting tool 35 is placed in a both-ends-held state in which both the distal end and the rear end thereof are supported, and, in this both-ends-held state, the cutting of the cutting stock 16 of the rotating differential case 10 is started by the cutting edge 51.

Figure 15:
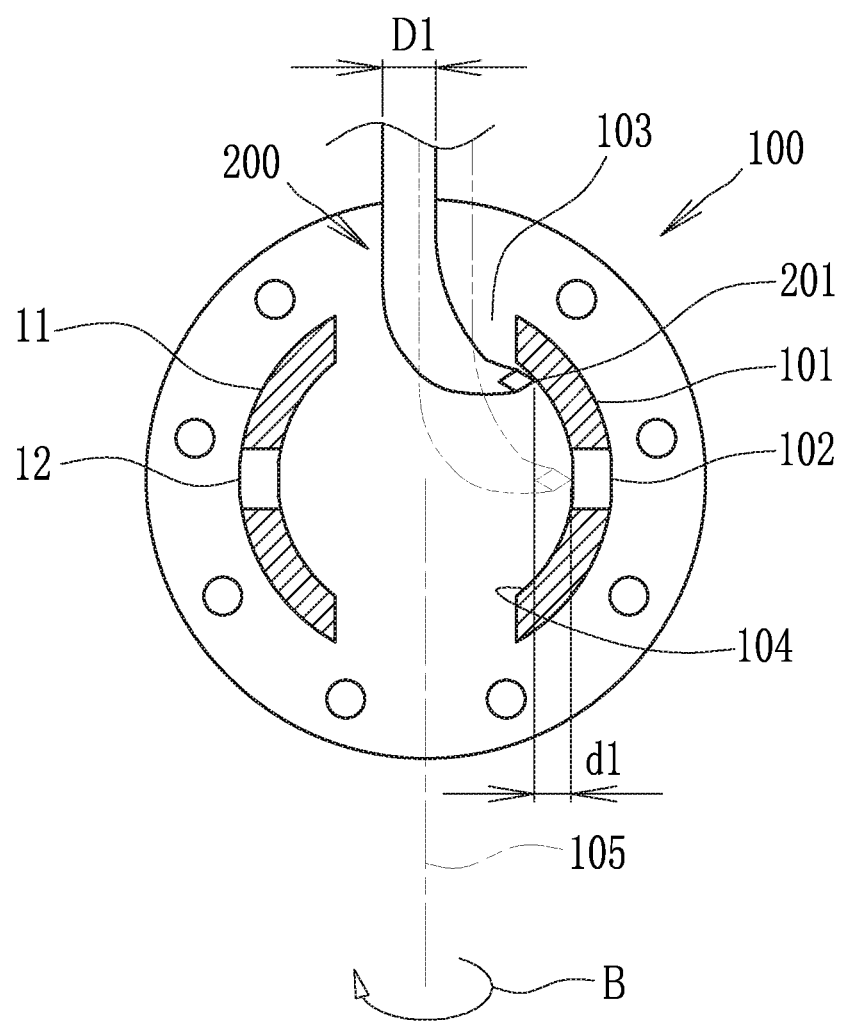
FIG. 15 is a schematic diagram illustrating the main part of a conventional example with the workpiece being machined.

Due to the machining in a both-ends-held state, it is possible to prevent resonance of the cutting tool 35 during machining, so that it is possible to increase the infeed by the cutting edge 51 and to expedite the cutting feed. That is, in the present embodiment, it is possible to perform heavy cutting, and to shorten the cutting time per workpiece 10. Further, since it is possible to prevent resonance, the cutting edge 51 is less subject to damage, and the service life of the cutting tool is elongated. Further, since it is possible to expedite the cutting feed, the cutting time can be shortened, so that the cutting distance (the path of the cutting edge 51 on the inner surface 15 along the rotational direction of the workpiece 10) is shortened, which also helps to elongate the service life of the cutting tool. In contrast, in the case where machining is performed with a cutting tool 200 in a cantilever-like state as illustrated in FIG. 15, resonance is likely to be generated, and it is necessary to reduce the infeed, and to delay the cutting feed. Thus, the cutting time per workpiece 10 is elongated, which is disadvantageous in attaining the effects as mentioned above.

Figure 11:
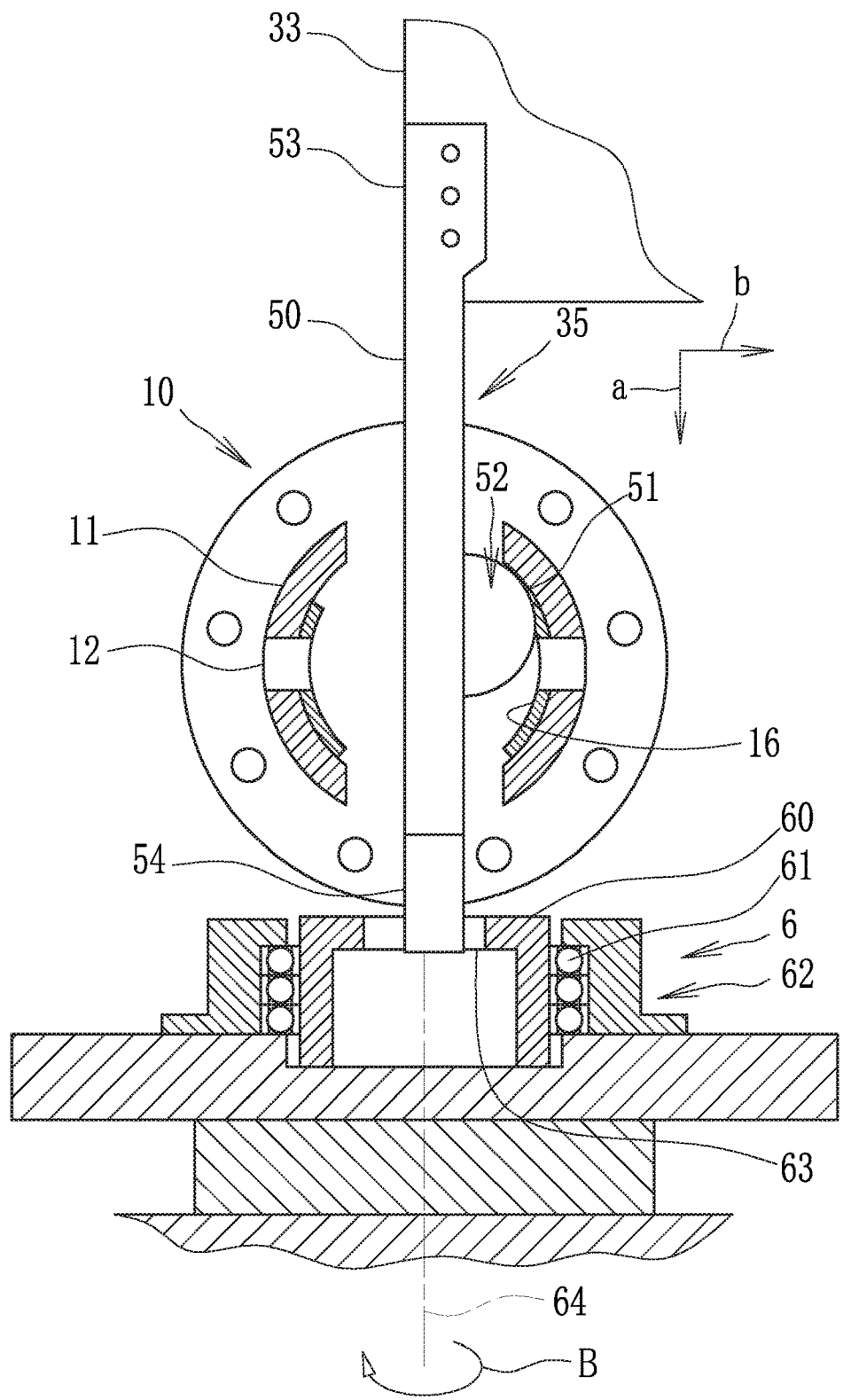
FIG. 11 is a sectional view of an embodiment of the present disclosure, illustrating the main part with the workpiece being machined.

FIG. 11 is a sectional view of the main part in the state in which the workpiece 10 is being machined. In the state of this drawing, the cutting tool 35 descends from the position of FIG. 10 (in the direction of arrow a), and moves horizontally to the outer side of the workpiece 10 (in the direction of arrow b). As a result, the cutting of the cutting stock 16 progresses, and a part of the cutting stock 16 is cut into a spherical surface. Since the engagement part 63 is a through-hole, the retaining part 54 can descend (in the direction of arrow a), and the retaining part 54 can move horizontally (in the direction of arrow b) along the engagement part 63. Also in the state of this drawing, the retaining part 54 at the distal end of the cutting tool 35 is inserted into the engagement part 63 of the cutting tool retaining body 60, and the cutting tool 35 is in a both-ends-held state.

Figure 12:
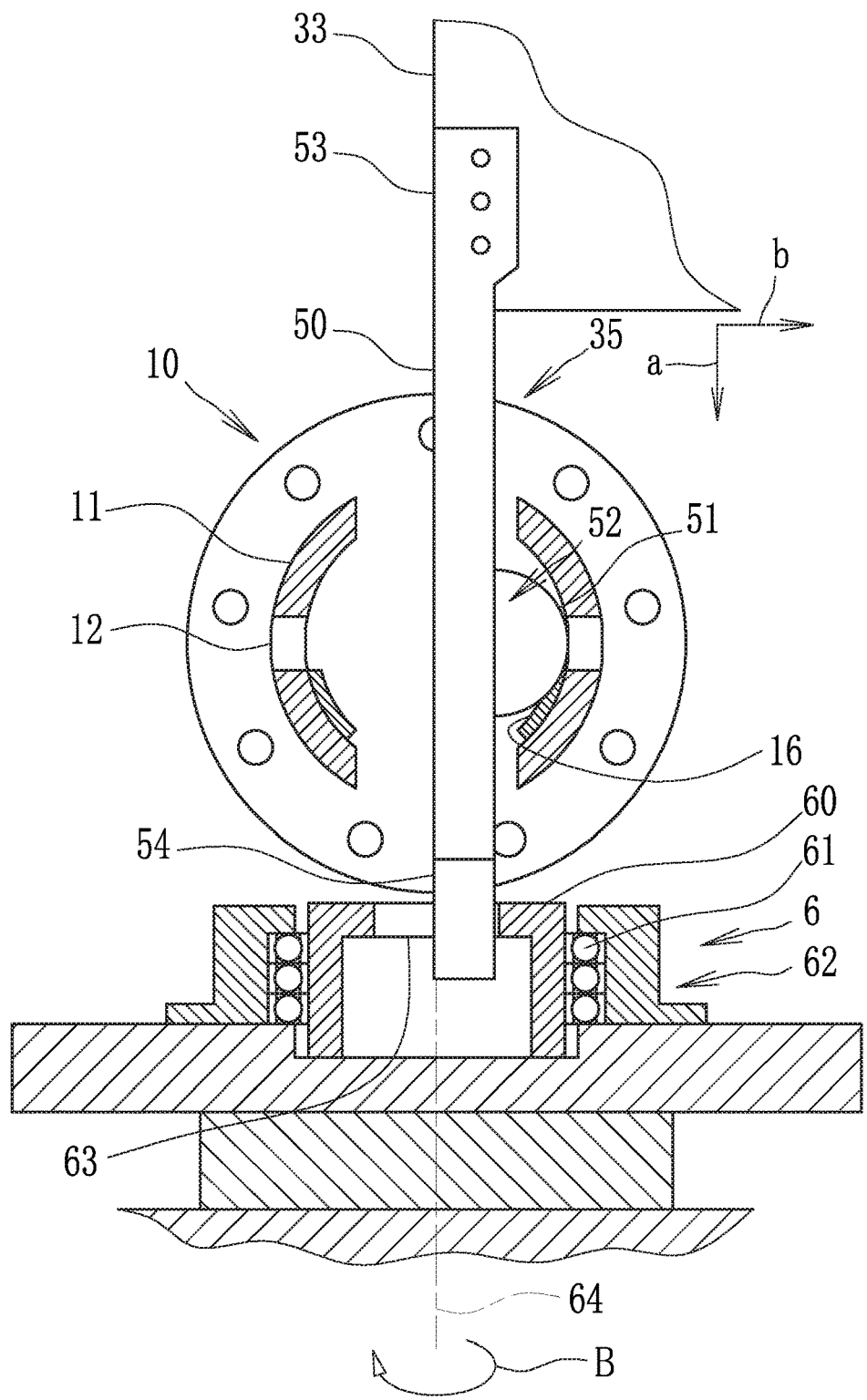
FIG. 12 is a sectional view of an embodiment of the present disclosure, illustrating the main part with the machining of the workpiece advanced.

FIG. 12 is a sectional view of the main part with the machining of the workpiece 10 having advanced. In the state of this drawing, the cutting tool 35 descends from the position of FIG. 11 (in the direction of arrow a), and moves horizontally to the outer side of the workpiece 10 (in the direction of arrow b). As a result, the cutting of the cutting stock 16 proceeds, and more than half the cutting stock 16 is cut into a spherical surface. As described above, the engagement part 63 is a through-hole, so that the retaining part 54 can descend (in the direction of arrow a), and the retaining part 54 can move horizontally (in the direction of arrow b) along the engagement part 63. Also in the state of this drawing, the retaining part 54 at the distal end of the cutting tool 35 is inserted into the engagement part 63 of the cutting tool retaining body 60, and the cutting tool 35 is in a both-ends-held state.

Figure 13:
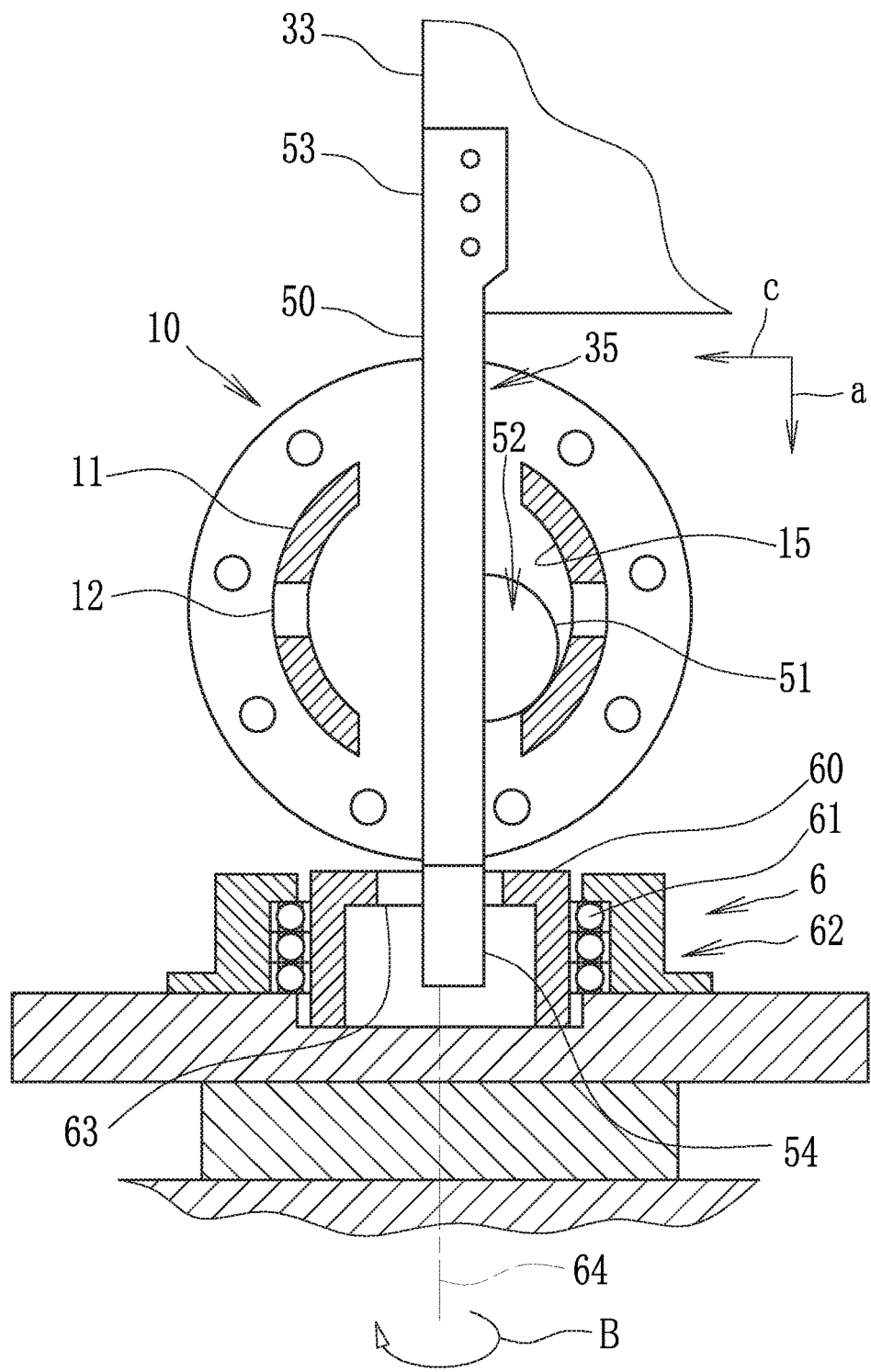
FIG. 13 is a sectional view of an embodiment of the present disclosure, illustrating the main part with the machining of the workpiece completed.

FIG. 13 is a sectional view of the main part in the state in which the machining of the workpiece 10 is completed. In the state of this drawing, the cutting edge 51 has moved from the position of FIG. 12 along the cutting stock 16, and the cutting tool 35 has descended (in the direction of arrow a), and has moved horizontally to the central side of the workpiece 10 (in the direction of arrow c). As a result, the cutting of the cutting stock 16 is completed, and the inner surface 15 of the workpiece 10 is cut into a spherical surface.

As described above, in the cutting according to the present embodiment, it is possible to prevent resonance through machining in a both-ends-held state, whereby it is possible to perform heavy cutting, to shorten the requisite cutting time per workpiece 10, and the service life of the cutting tool is elongated. This effect is due to the machining in a both-ends-held state, and the configuration of the cutting edge 51 may not be arcuate. For example, as in the case of a cutting edge 201 illustrated in FIG. 15, it may have a tip end at an acute angle. On the other hand, the service life of the cutting tool is elongated also due to the provision of the arcuate cutting edge 51. This will be illustrated with reference to FIG. 14.

Figure 14:
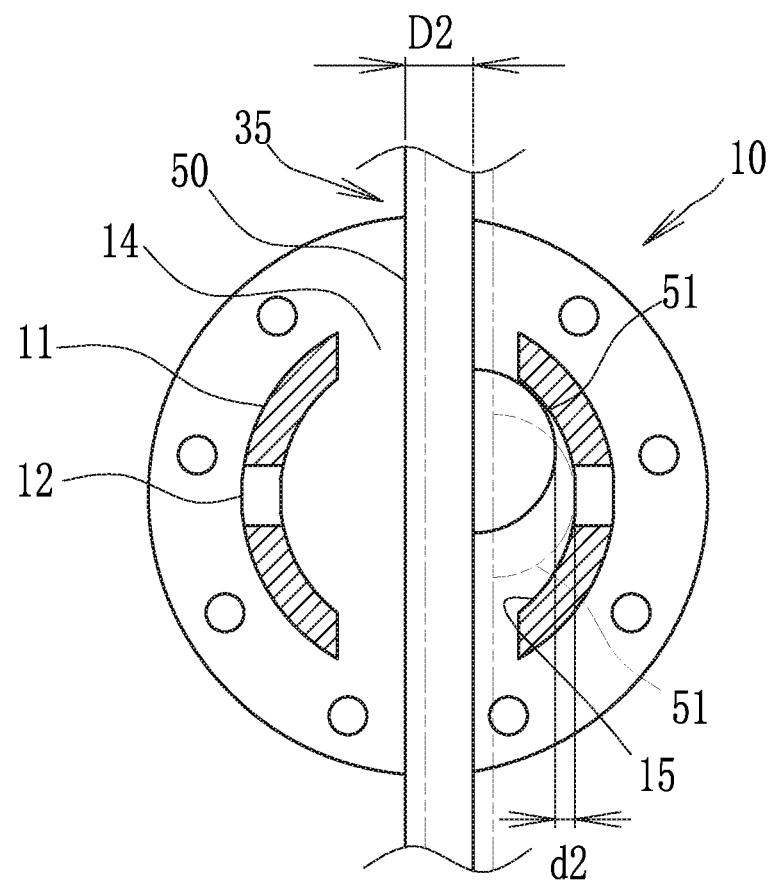
FIG. 14 is a schematic view of an embodiment of the present disclosure, illustrating the main part of the workpiece being machined.

FIG. 14 is a diagram illustrating the main part of the workpiece 10 being machined. In the cutting tool 35 indicated by the solid line, the cutting edge 51 has started to abut the inner surface 15 of the workpiece 10. In the cutting tool 35 as indicated by the chain double-dashed line, the apex of the arcuate cutting edge 51 has abutted the inner surface 15 of the workpiece 10, with the cutting tool 35 having moved in the horizontal direction. Unlike the conventional example illustrated in FIG. 15, in the arcuate cutting edge 51, no specific point is kept contact with the inner surface 15 all the time. Cutting is possible so long as the cutting edge 51 is in contact with the inner surface 15, and the cutting proceeds with the cutting edge 51 being kept in contact with the inner surface 15 all the time while changing the cutting point. That is, the cutting edge 51 bears the cutting with respect to the workpiece 10 over a wide range, so that the burden on the cutting edge 51 is relieved, and the wear of the cutting edge 51 is reduced, with the service life of the cutting edge 51 being elongated.

Further, as described above, the cutting edge 51 bears the cutting with respect to the workpiece 10 over a wide range. Thus, in the case where the workpiece 10 in FIG. 14 and the workpiece 100 in FIG. 15 are the same, the moving distance d2 in the horizontal direction of the cutting tool 35 in FIG. 14 is shorter than the moving distance d1 of the conventional cutting tool 200 in FIG. 15. When the moving distance of the cutting tool 35 is short, it is advantageous in preventing interference of the shaft part 50 and the workpiece 10 with the opening 14, and there is room left for enlarging the diameter D2 of the shaft part 50 of the cutting tool 35. When the diameter D2 of the shaft part 50 of the cutting tool 35 is enlarged to achieve an enhancement in rigidity, it is possible to increase the infeed by the cutting edge 51, and to expedite the cutting feed, which is advantageous for heavy cutting.

The above embodiment of the present disclosure has only been described by way of example and allows modification as appropriate. For example, while in the above embodiment the cutting tool 35 is moved to machine the workpiece 10, it is also possible to move the workpiece 10 to perform machining thereon. Further, while in the above-described example the engagement part 63 provided in the cutting tool retaining body 60 is a through-hole, the engagement part may also be a stopped groove-like hole so long as it allows engagement of the cutting tool 35 with the retaining part 54.

1 machining apparatus
10 workpiece (differential case)
14 opening
50 shaft part
35 cutting tool
51 cutting edge
52 tip
53 fixing part
54 retaining part
63 engagement part

What is claimed is:

1. A cutting tool for machining a differential case, the cutting tool being attached to a machining apparatus and used to perform cutting on a spherical inner surface of a differential case,
   the cutting tool comprising:
      a shaft part;
      a semicircular cutting edge integrally and immovably fixed to the shaft part and laterally protruding from the shaft part;
      a fixing part formed at one end side of the shaft part and that is for fixing the shaft part to the machining apparatus; and
      a retaining part formed at the other end side of the shaft part and that is for retaining the shaft part to be retained by the machining apparatus, and
   the differential case comprising:
      a cylindrical part;
      shaft holes being a pair of through-holes in a side surface of the cylindrical part;
      a pair of openings in the side surface of the cylindrical part; and
      a pair of axle holes at an upper and lower portions of the cylindrical part,
   wherein the cutting tool is configured to perform cutting on the spherical inner surface of the differential case where the shaft holes are provided without rotating the shaft part and the semicircular cutting edge while rotating the differential case integrally with a rotary body of the machining apparatus fixed to the differential case when the shaft part and the semicircular cutting edge fixed to the shaft part are inserted into an inside of the differential case through one of the pair of openings in a both-ends-held state in which both the fixing part and the retaining part are supported by the machining apparatus.

2. A machining apparatus for a differential case using the cutting tool for machining a differential case according to claim 1, wherein the machining apparatus for a differential case is equipped with an engagement part engaged with the retaining part.

3. A machining method for a differential case using the cutting tool for machining a differential case according to claim 1, wherein in a both-ends-held state in which both the fixing part and the retaining part are supported by the machining apparatus, the cutting edge is brought into contact with the inner surface of the differential case; and the differential case or the cutting tool is moved to perform cutting on the spherical inner surface of the differential case while varying a contact position where the cutting edge and the inner surface of the differential case are held in contact with each other.

4. The cutting tool according claim 1, wherein a radius of the semicircular cutting edge is smaller than a radius of the spherical inner surface of the differential case.

5. The cutting tool according claim 1, wherein the fixing part and the retaining part of the cylindrical part move in a direction perpendicular to the cylindrical part.

6. The cutting tool according to claim 1, wherein a diameter end of the semicircular cutting edge is parallel to the shaft part.

7. The cutting tool according to claim 1, wherein the semicircular cutting edge is sandwiched between a receiving part and a support plane extending from the shaft part thereby the semicircular cutting edge is integrally fixing to the shaft part.

* * * * *